US006823232B2

(12) United States Patent
Murphy

(10) Patent No.: US 6,823,232 B2
(45) Date of Patent: Nov. 23, 2004

(54) DRIVE CONTROLLER OPERATOR INTERFACE AND SERIAL PROTOCOL

(75) Inventor: Marc Murphy, Manchester (GB)

(73) Assignee: Siemens Aktiengesellschaft, Munich (DE)

(*) Notice: Subject to any disclaimer, the term of this patent is extended or adjusted under 35 U.S.C. 154(b) by 260 days.

(21) Appl. No.: 09/879,037

(22) Filed: Jun. 13, 2001

(65) Prior Publication Data

US 2003/0033026 A1 Feb. 13, 2003

(30) Foreign Application Priority Data

Dec. 18, 2000 (DE) ...................................... 20021357 U

(51) Int. Cl.$^{7}$ ................................................ G06F 19/00

(52) U.S. Cl. ............................. 700/180; 700/17; 700/9; 700/25; 700/170; 340/825; 363/95; 363/109; 363/120; 710/315; 710/105

(58) Field of Search ................................ 700/17, 9, 25, 700/170, 180; 340/825; 710/315, 105; 363/95–120

(56) References Cited

U.S. PATENT DOCUMENTS

| | | | | | |
|---|---|---|---|---|---|
| 5,025,486 | A | * | 6/1991 | Klughart | 340/3.1 |
| 5,150,024 | A | * | 9/1992 | Kimura et al. | 318/568.1 |
| 5,805,127 | A | * | 9/1998 | Sonnek | 345/95 |
| 6,009,363 | A | * | 12/1999 | Beckert et al. | 701/33 |
| 6,366,747 | B1 | * | 4/2002 | Roller | 399/110 |
| 6,430,634 | B1 | * | 8/2002 | Mito | 710/100 |
| 6,510,524 | B1 | * | 1/2003 | Osborn et al. | 713/323 |
| 6,642,629 | B2 | * | 11/2003 | DeLeeuw | 307/10.1 |

* cited by examiner

*Primary Examiner*—Anthony Knight
*Assistant Examiner*—Thomas Pham
(74) *Attorney, Agent, or Firm*—Crowell & Moring LLP

(57) ABSTRACT

A drive controller operator interface and serial protocol therefor are provided for controlling electric motors and other electrical devices which are typically powered by inverters that convert input power to control input signals for the motor or other electrical device. The system includes a removable keypad/display unit controller which can serve a number of drives, as well as an improved serial protocol, that includes a provision for data indicating the type of device to which the drive is attached.

13 Claims, 5 Drawing Sheets

| | | | | | |
|---|---|---|---|---|---|
| PAD Byte 0xFF | Stx 0x02 | Message_ Type | Device_ Type | Features | CRC |

Fig. 6

| | | | | | |
|---|---|---|---|---|---|
| PAD Byte 0xFF | Stx 0x02 | Message_ Type | Command | DATA | CRC |

Fig. 7

| | | | | | |
|---|---|---|---|---|---|
| PAD Byte 0xFF | Stx 0x02 | Message_ Type | Device_ Type | KEYS | CRC |

Fig. 8

| | | | | | | |
|---|---|---|---|---|---|---|
| Display Control. | Digit 4 | Digit 3 | Digit 2 | Digit 1 | Digit 0 | Symbol 1 |

Fig. 9

| | | | | | | |
|---|---|---|---|---|---|---|
| Display Control | Digit 5 | Digit 4 | Digit 3 | Digit 2 | Digit 1 | Digit 0 |

Fig. 10

DRIVE CONTROLLER OPERATOR INTERFACE AND SERIAL PROTOCOL

FIELD OF INVENTION

The present invention relates to drive controllers as used in machinery drives, for motor control and the like. In particular the present invention relates to a drive controller operator interface and serial protocol therefor.

BACKGROUND TO THE INVENTION

In an industrial plant, to enable machinery to operate, for example, a conveyor belt in a production line, pumps, compressors, ventilation systems, hoisting gear, cranes etc electric motors are employed. Electric motors may drive machinery directly by means of a clutch, by way of a transmission belt, hydraulic path, or some other means. The motor itself may drive a low wattage (less than 100 W) application such as a drive for a laboratory centrifuge or a high wattage (greater than 300 KW) application such as a steel press. The motors can be DC or AC, single phase or multiple phase.

Electric motors and other electrical devices are typically controlled by inverters which convert input power to control input signals for the motor or other electrical device. Inverters are controlled by a control panel. The inverters themselves are typically placed in a rectangular box dimensioned 10 cm×15 cm×20 cm but, depending on power requirements, may be much smaller or much larger. Conveniently the converters are packaged with other electrical control equipment.

Since the inverter controllers include keyboard controls and LED/LCD displays, it has been found that the controllers represent a significant cost of the inverters. To overcome this or for other reasons such as overall control integration, inverters have been remotely controlled by software using cabling operated on RS232 protocols or similar. However, it has been found in some applications, that cabling is susceptible to interference.

An alternative system is to have single removable keypad/display unit controller which can serve a number of drives. The single key pad/display unit controller is selectively attached to a number of drives, the instructions downloaded to the drive and then keypad/display unit controller is removed. Alternatively a number of removable keypad/display unit controllers may be employed by a limited number of users. One advantage of this type of system is that the drives may not be controlled by those not authorised. These keypad/display unit controllers shall be referred to hereinafter as a BOP (Basic Operator Panel). BOP'S have been found to be sufficiently flexible to accommodate various styles of LCD, such as simple four digit displays and are provided with varying numbers of pinouts, depending on the application. In use, a BOP is attached to a drive and co-operating connector pins and sockets (pinouts) enable single signals to be transmitted. A BOP operator will instruct a memory associated with the drive via the keypad using a serial data link. Alternatively an optical link will transfer data in which case the BOP has an integrated electrical cell to provide electrical power; be coupled with a power source associated with the drive or otherwise be connected to a power source.

One problem associated with this system is that standard signaling protocols do not provide sufficient data carrying capacity to enable data to be transferred as effectively as possible. Another problem that has arisen is that a BOP cannot necessarily be used with other types of devices.

OBJECT OF THE INVENTION

The present invention seeks to provide an improved drive controller.

STATEMENT OF INVENTION

In accordance with a first aspect of the present invention there is provided a drive controller and operator panel operable to control a drive, wherein the operator panel is removable with respect to the drive controller and includes data input means and a data transfer port; wherein the drive controller is operatively connected to the drive and includes a data transfer port which is operable to co-operate with the data transfer port of the operator panel whereby to enable the drive controller and the operator panel to communicate data by means of a serial protocol; wherein the serial protocol includes data indicating the device type of the device transmitting the data.

The data transfer can be effected by means of optical signals, electrical signals, or wireless signals. Accordingly, co-operating optical transmitter and receiver pairs, co-operating plug and sockets and co-operating wireless transceiver means are required. The display on the operator panel can be an LCD or LED display. Preferably the LCD or LED display is triplexed whereby the amount of signaling can be reduced. Where there are micro-input/output pins, this means that the number of pins can be reduced.

Conveniently the protocol includes a cyclic redundancy check byte. Conveniently the protocol also includes a data field which is a field of variable length. In accordance with a further aspect of the present invention there is provided an operator panel operable in the above arrangement. In accordance with a further aspect of the invention there is provided a drive controller operable in the above arrangement.

In accordance with a still further aspect of the present invention there is provided a signaling protocol for data communication between a drive controller and an operator panel, whereby to control a drive, wherein the protocol includes data indicating the device type in respect of the device transmitting the data.

Preferably the protocol includes a data field which is a field of variable length. Preferably the signalling protocol includes a cyclic redundancy check bit.

BRIEF DESCRIPTION OF THE FIGURES

The invention may be understood more readily, and various other aspects and features of the invention may become apparent, from consideration of the following description and the Figures as shown in the accompanying drawing sheets, wherein:

FIG. 6 shows the format of a login message;

FIG. 7 shows the format of a standard command message;

FIG. 8 shows the format of a standard status message; and

FIGS. 9 and 10 show, respectively, the format of 5 and 6 digit display data messages.

DETAILED DESCRIPTION OF INVENTION

There will now be described, by way of example, the best mode contemplated by the inventors for carrying out the invention. In the following description, numerous specific details are set out in order to provide a complete understanding of the present invention. It will be apparent, however, to those skilled in the art, that the present invention may be put into practise with variations of the specific.

Figure 1:
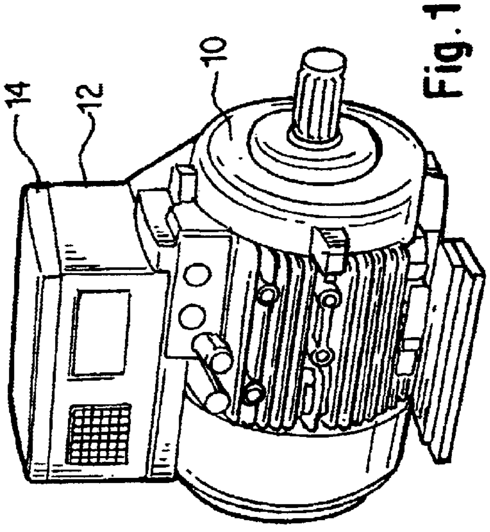
FIG. 1 shows a motor with a drive controller.
Figure 2:
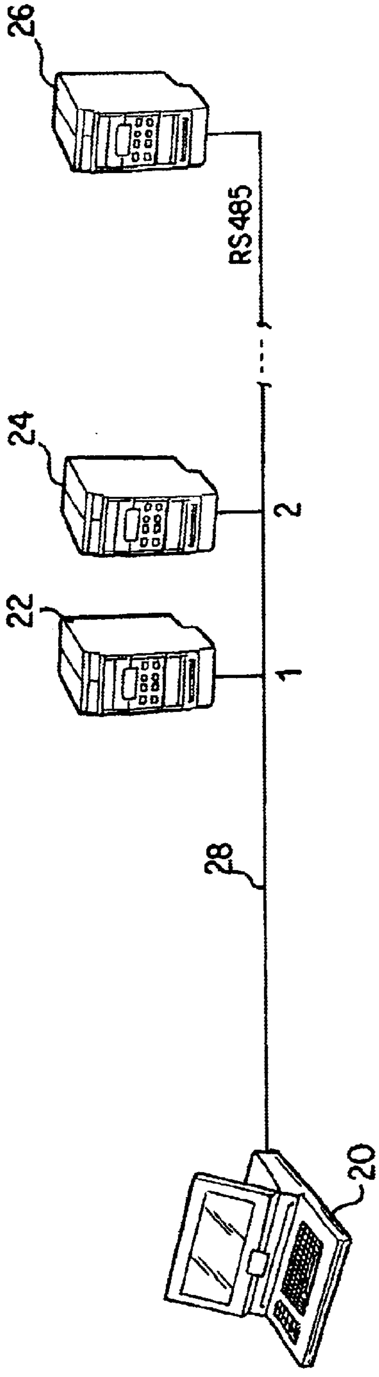
FIG. 2 shows a p c connected to several drive controllers.

With reference to FIG. 1 there is shown a motor (10) having a terminal box (12) and drive controller atop the terminal box. FIG. 2 shows a laptop computer (20) connected to first (22), second (24) and thirty-first (26) drive controllers. The drive controllers are connected, conveniently, by RS485 cabling (28). This sort of system can provide remote drive control at distances of up to 1000 meters.

Whilst the function of a drive is considered to be simple, for example, in the case of conveyor belt, at the start of a day a drive is switched on, the speed of a motor is increased to an operating speed, and the operating speed is maintained until, at the end of the day, speed is reduced and the drive is switched off. In a manufacturing process, the use of a drive may be discontinuous and may be timed or be dependent upon another operation being completed. Different process steps could require different rates of increase in speed; a frequency of operation may vary. Special features such as automatic restart following restoration of power subsequent to power failure may also be required. In addition different serial interfaces may be addressed e.g. RS485, RS232, USS Protocol and proprietary BUS/control systems e.g.. PROFIBUS (RTM), CAN-Bus (TM) etc. Depending on the type of motor concerned, other operating variables susceptible to control comprise; frequency range e.g. 0–140 Hz, frequency resolution e.g. 0.1 Hz; temperature drift e.g. <0.02% from lowest to highest frequency: linear or quadratic frequency characteristics; overload protection; overheating switch off; and many more.

Figures 3A, 3B, 3C:
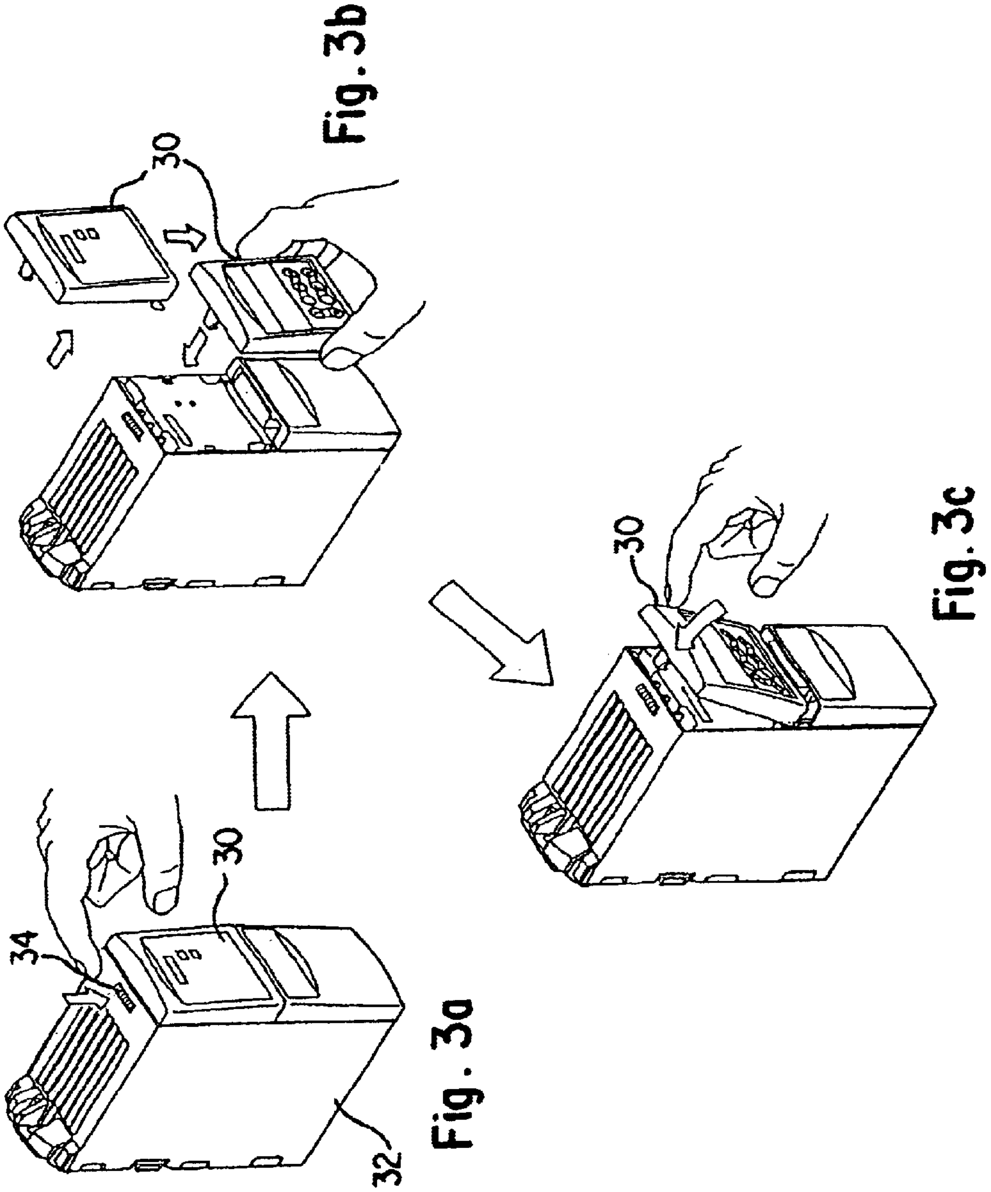
FIG. 3 shows a first embodiment of the invention.
Figure 4:
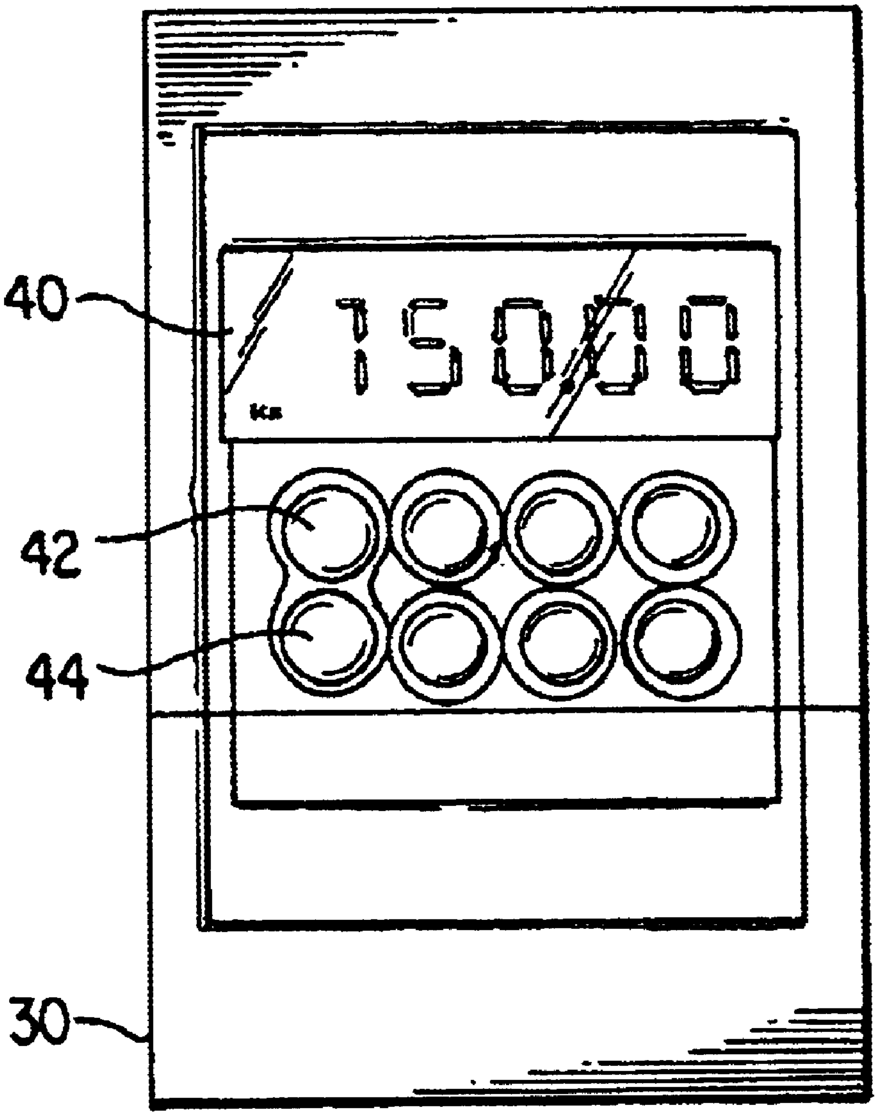
FIG. 4 shows a sample serial protocol in accordance with the invention.

The present invention comprises a simple form of a serial protocol that can be used to communicate between the base drive unit and the removable basic operator panel, In order to keep the costs low for the operating panel, it is preferable that the power of the processor is greatly reduced. The serial protocol consists of messages from the drive to indicate what should be displayed, and messages to the drive to indicate the state of keypad inputs. FIG. 3*a* shows a BOP (30) in operative connection with drive controller (32) a finger operated catch can be depressed in order to release the BOP from the drive controller. FIGS. 3*b* and 3*c* show how the BOP (30) is re-inserted into the electronic controller.

In a preferred implementation, the drive interface can be a 4 way telephone socket/jack. The four signals comprise: 0V & 6.5V power supplies and Tx & Rx signals. The serial data communications to the drive can conveniently be RS232 level at 9.6 kbaud with 1 start bit, 8 data bits (1sb first), no parity and 1 stop bit. Optional links may also be employed as well as other wireless links such as radio frequency links. Figure four details a typical BOP having a display (40) and keypad elements (42, 44).

Figure 5:
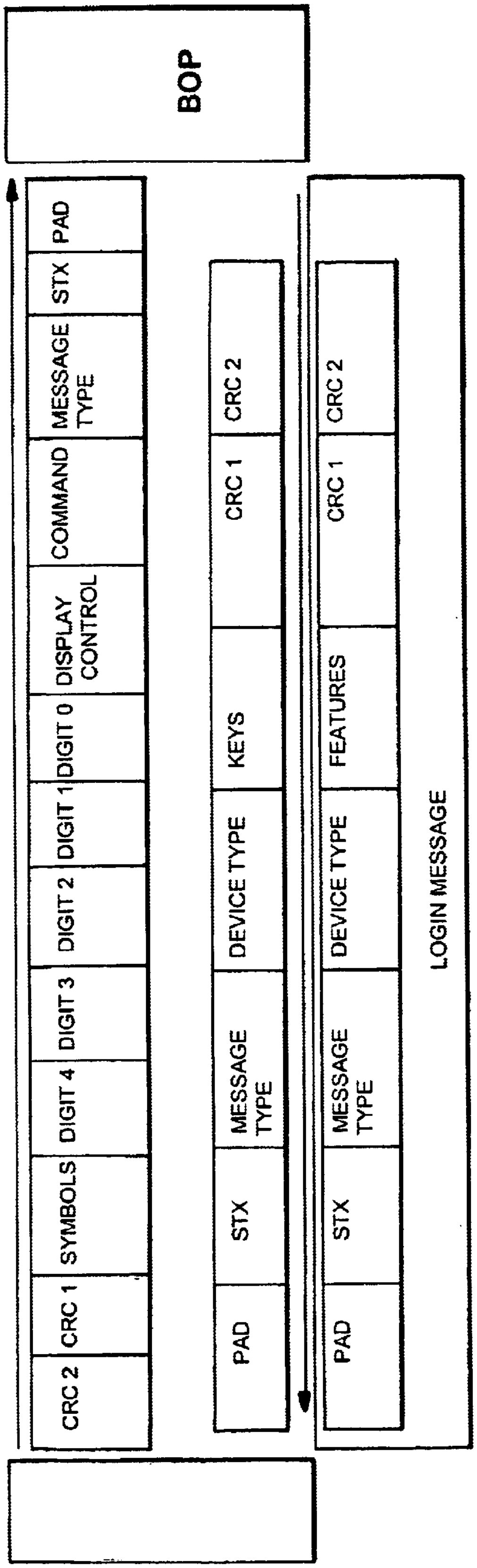
FIG. 5 shows a signal sequence and format between a drive controller and a BOP.

Referring to FIG. 5, the drive and the BOP communicate with each other sequentially in a half-duplex manner, This figure shows the format of a login message from the BOP to a drive, upon receipt of a complete, correct message frame or packet, the drive responds with a reply message frame. When the associated drive does likewise a message interchange rate of up to 45 Hz results, a suitable display and keypad refresh rate may then be chosen between 22 and 200 ms, determined by the inverter scan rate.

The first message after the keypad powers up will be the LOGIN data packet, With reference to FIG. 6, there is shown the structure of a LOGIN message which has a length of 7 bytes: padding byte, start byte, message type byte, device type byte, features byte and a cyclical redundancy check (CRC) byte, transmitted in that order. The CRC will include the data field only, not the start and padding bytes.

The drive will act as a slave until the correct login information is received. Once the drive has acknowledged the message, the drive mode is changed to master, and the keypad changes to a slave state. This is to allow the use of more than one device on the serial communications channel. Between packets, there is a requirement determined by the BOP that the serial line should remain high in the marking state for a minimum of one character period. This occurs naturally in the implementation of this protocol and always occurs on the transmit line of the BOP. A reply to this message is then made, with a 13 bytes long standard command message to the BOP, which message consists of; a header comprising a padding byte and a start byte, followed by message type, command, data field bytes and CRC word, transmitted in that order, as shown in FIG. 7.

The keypad will reply to the standard command message with the keypad status information, the standard status message reply to an UPSEGS or NOUP command, which relate to the UPdating of a particular SEGment or maintenance (NO-UPdate) of a particular segment. This 7 byte message (for the standard 7 key BOP, 9 or more for extended keyswitch variants) is transmitted by the BOP only on receipt of a valid command or after a timeout. It consists of the following; padding byte, start byte, message type, device type, keys and CRC word, transmitted in that order, as shown in FIG. 8. The drive responds, in time, with another standard command message.

In order to prevent data corruption causing spurious signals the data must include a check sum preventing, in a first instance, display corruption and in another instance spurious keypad instructions. The type of check sum used should prevent most corrupt data being accepted but also not be such an overhead on the basic operator panel processor. While transferring the data it must be packed in a controlled manner, this will consist of padding bytes, start bytes, data and a CRC of a 16 byte length.

All messages will have a common structure except for 'LOGIN' packets, which differ in the message content. The fields, in order of transmission are as follows:

1. Padding byte 0×FF; 2. Start of message byte 0×02; 3. Message type; 4. Device type; 5. Message; and 6. CRC.

Note that not all the fields are included in all packet types. The command field specifies the action to be performed by the keypad controller.

| Value | Text | Assigned Function |
|---|---|---|
| 0xA5 | LOGIN | Send a LOGON packet next, not STATUS |
| 0x05 | NOUP | No new display data, just send STATUS packet (the segment bits are don't care) |
| 0x06 | UPSEGS | Update display LCD segments and send STATUS packet |

The message type field specifies the class of message data to follow. It allows the extension of the normal fixed packet size to a variable length packet, with the message length as part of the packet, Following this field. Use of this field can also alter the interpretation of the message data.

| Value | Originator | Assigned Function |
|---|---|---|
| 0x00–0x03 | | Reserved |
| 0x04 | Keypad | Keypad interface fixed length STATUS message |
| 0x04 | Drive | Keypad interface fixed length command message |
| 0x05 | Keypad | Keypad interface fixed length STATUS message: Timeout occurred in transmitter. |
| 0x05 | Drive | Keypad interface fixed length command message: Timeout occurred in transmitter. |
| 0x06 | Both | Keypad interface with next byte as message length |

-continued

| Value | Originator | Assigned Function |
|---|---|---|
| 0x07 | Both | Keypad interface with next byte as message length: Timeout occurred in transmitter. |
| 0x0A | Both | Advanced Operator interface fixed length STATUS or command message |
| 0x0B | Both | Advanced Operator interface next byte as message length |
| 0x10 | Keypad | Keypad interface fixed length LOGIN message |
| 0x11 | Keypad | Keypad interface fixed length LOGIN message: Timeout occurred in transmitter. |
| 0x40 | PC | Echo message. Same as mirror on USS. |

All messages must contain the message type byte as the 3rd byte to be transmitted The transmitter may be either the drive or operator panel/keypad controller, but some field values may only be transmitted by either the keypad or the drive controller, as indicated in the table. The actual keypad implementation connected may further limit the values. A recipient will ignore any values that it cannot handle, rejecting the rest of the packet.

The device type field is used to indicate the connection type and is included only in the packets sent by a BOP. It indicates whether, for example, the BOP is connected to the drive. This field should not change after LOGIN or an error should be flagged. The bit allocations are as follows;

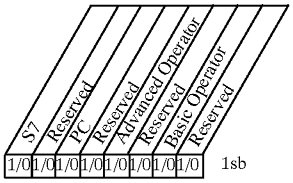

| Field | Bit Number | Assigned function |
|---|---|---|
| Reserved | 0 | Reserved |
| Basic Operator | 1 | Identifies that a Basic Operator panel has been connected, if set. |
| Reserved | 2 | Reserved |
| Advanced Operator | 3 | Identifies that a Advanced Operator panel has been connected, if set. |
| Reserved | 4 | Reserved |
| PC | 5 | Identifies that the PC package is connected, if set. |
| Reserved | 6 | Reserved |
| S7 | 7 | Identifies that an S7 based system is connected, if set. |

There can be various combinations of S7& PC, S7& advanced operator, S7& basic operator as indicated below, but all other combinations must be rejected:

| S7 | PC | Advanced Operator | Basic Operator | Action |
|---|---|---|---|---|
| 0 | 0 | 0 | 0 | Unknown Device Type |
| 0 | 0 | 0 | 1 | Basic Operator Panel connected |
| 0 | 0 | 1 | 0 | Advanced Operator Panel connected |
| 0 | 0 | 1 | 1 | Unknown Device Type |
| 0 | 1 | 0 | 0 | PC connected ( RS 232 ) |
| 0 | 1 | 0 | 1 | Unknown Device Type |
| 0 | 1 | 1 | 0 | Unknown Device Type |
| 0 | 1 | 1 | 1 | Unknown Device Type |

-continued

| S7 | PC | Advanced Operator | Basic Operator | Action |
|---|---|---|---|---|
| 1 | 0 | 0 | 0 | S7 device connected ( PLC/PROFIBUS ) |
| 1 | 0 | 0 | 1 | Basic Operator Panel communicating inS7 protocol connected |
| 1 | 0 | 1 | 0 | Advanced Operator Panel communicating in S7 protocol connected |
| 1 | 0 | 1 | 1 | Unknown Device Type |
| 1 | 1 | 0 | 0 | PC communicating in S7 protocol connected |
| 1 | 1 | 0 | 1 | Unknown Device Type |
| 1 | 1 | 1 | 0 | Unknown Device Type |
| 1 | 1 | 1 | 1 | Unknown Device Type |

The features field is only contained in the LOGIN packet sent from BOP to the drive, and is used to indicate the capabilities of the BOP with regard to display type, switches etc. The encodings differ according to the type of BOP as indicated by the device type.

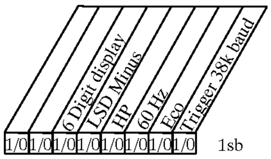

| Field | Bit Number | Assigned function |
|---|---|---|
| 6 Digit display | 5 | Specifies that there is a 6 digit display connected if set. If 0, then it is a 5 digit display with symbols. |
| LSD Minus | 4 | Specifies that there is a leading minus sign available, when set. |
| HP | 3 | Specifies that Horse Power must be used in the drive software & operation |
| 60 Hz | 2 | Specifies that 60 Hz profile must be used in the drive software & operation |
| Eco | 1 | Specifies that an Eco drive keypad is connected |
| Trigger 38k baud | 0 | Specifies that 38k baud should be used after the LOGIN message has been received, when set. |

Unused bits are set to zero.

The data field consists of several bytes and is part of the packet sent from drive to BOP or from the BOP to the drive. The content is dependent on the type of BOP. The content for a BOP data Field is detailed below:

The display control byte for the BOP performs ancillary display control functions, as well as controlling display segments not accommodated by the bulk of the field. This is transmitted to the BOP.

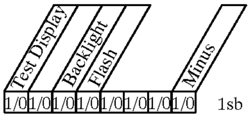

| Field | Bit Number | Assigned function |
|---|---|---|
| Test Display | 7 | Puts the display into test mode. Lighting all segments and indicators until bit reset by drive. |
| Backlight | 5 | Switch on the backlight when set. Off when re-set |

-continued

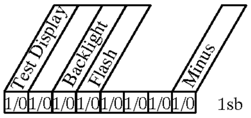

| Field | Bit Number | Assigned function |
|---|---|---|
| Flash | 4 | Causes the display to flash at 1 Hz when set. Normal display when re-set. |
| AUTO | 3 | When set, illuminates the “AUTO(3)” symbol segment. |
| REMOTE | 2 | When set, illuminates the “REMOTE(4)” symbol segment |
| HAND | 1 | When set, illuminates the “HAND” symbol segment. |
| MINUS | 0 | Causes the display to illuminate the minus sign when set. |

The digit display information byte controls the state of the segments of a 7-segment digit. Note that the DP is to the left of the parent digit. The quantity of these bytes is set by the number of digits in the display, so there will be 5 similar bytes for the basic 5 digit unit. The first byte transmitted will be the most significant (left hand) digit on the display panel. Note that the left hand digit has no DP so the corresponding bit 7 will be “don't care”. These are transmitted to the BOP.

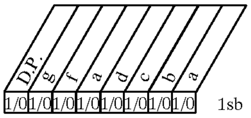

| Field | Bit Number | Assigned function |
|---|---|---|
| D.P. | 7 | Causes the display to illuminate the ‘Decimal Point’ segment when set. |
| g | 6 | Causes the display to illuminate the ‘g’ segment when set. |
| f | 5 | Causes the display to illuminate the ‘f’ segment when set. |
| E | 4 | Causes the display to illuminate the ‘e’ segment when set. |
| d | 3 | Causes the display to illuminate the ‘d’ segment when set. |
| c | 2 | Causes the display to illuminate the ‘c’ segment when set. |
| b | 1 | Causes the display to illuminate the ‘b’ segment when set. |
| a | 0 | Causes the display to illuminate the ‘a’ segment when set. |

The symbol control bytes are used to control the annunciator segments of the display. Naturally, these bytes are not present in a message sent to a 6 digit display panel. The 5 digit message only transmits one byte and it follows the digit information. These are transmitted to the BOP.

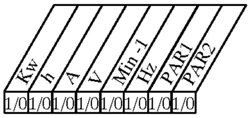

| Field | Bit Number | Assigned function |
|---|---|---|
| kW | Byte1: 7 | Scaling for displayed value is kW |
| h | Byte1: 6 | Scaling for displayed value is hours |
| A | Byte1: 5 | Scaling for displayed value is Amps |
| V | Byte1: 4 | Scaling for displayed value is Volts |
| Min-1 | Byte1: 3 | Scaling for displayed value is Min-1 |
| Hz | Byte1: 2 | Scaling for displayed value is Hz |
| P(2) | Byte1: 1 | Parameter set 2 is currently active |
| P(1) | Byte1: 0 | Parameter set 1 is currently active |

The keys byte indicates the state of a keypad (bit set when its corresponding key is closed), and is transmitted by the BOP. The RUN key is presented twice for security. Note that the keystate provided are not debounced and this needs to be performed by the inverted controller, reading the keystate frequently.

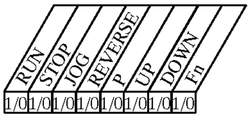

| Field | Bit Number | Assigned function |
|---|---|---|
| RUN | 7 | Indicates RUN Key pressed. |
| STOP | 6 | Indicates STOP Key pressed. |
| JOG | 5 | Indicates JOG Key pressed. |
| REVERSE | 4 | Indicates REVERSE Key pressed. |
| P | 3 | Indicates P Key pressed. |
| UP | 2 | Indicates UP Key pressed. |
| DOWN | 1 | Indicates DOWN Key pressed. |
| Fn | 0 | Indicates Function Key pressed. |

The extra keys byte is transmitted by a BOP with more than 7 keys fitted. It is not present in a normal message. Its presence is indicated using the variable length feature of the message type field, and follows the standard keys.

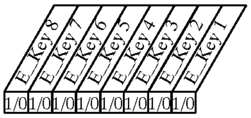

| Field | Bit Number | Assigned function |
|---|---|---|
| E_Key 8 | 7 | Indicates Extra Key 8 pressed. |
| E_Key 7 | 6 | Indicates Extra Key 7 pressed. |
| E_Key 6 | 5 | Indicates Extra Key 6 pressed. |
| E_Key 5 | 4 | Indicates Extra Key 5 pressed. |
| E_Key 4 | 3 | Indicates Extra Key 4 pressed. |
| E_Key 3 | 2 | Indicates Extra Key 3 pressed. |
| E_Key 2 | 1 | Indicates Extra Key 2 pressed. |
| E_Key 1 | 0 | Indicates Extra Key 1 pressed. |

More Keys could be catered for by the creation of a new message type.

If the keypad connected to the drive is a 5 digit & 11 symbol keypad, the message will be structured as the standard message length of 13 bytes with the data field constructed as: display control, digit 4, digit 3 to digit 0 (the LS or right hand digit), and symbol control 1, transmitted in that order, as shown in FIG. 9 If the display is a 6 digit display then the message structure will change, as shown in FIG. 10. It will still be the same length but the symbol display information will be displaced by digits 4 & 5. If a 6 digit display is employed, then there may be a reduced facility for the legends and possibly no facility for a leading minus sign.

The CRC is used on all packets and includes all bytes except for the padding and start bytes. This is the standard CRC-16 algorithm using a $X^{16}+X^{15}+X^{2}+1$ polynomial. Its details maybe given in the form:

| | |
|---|---|
| Width | 16 bits |
| Polynomial | 8005 |
| Initialise CRC register to | FFFF (fudge for direct table algorithm) |
| Data Reflect In | TRUE |
| Reflect Out | TRUE |
| XOR Data out with | 0000 |
| Check value | 0x4B37 (for ASCII "123456789") |

The 8 least significant bits (0–7) of the CRC word will be transmitted first. This is designed for compatibility with hardware implementations where the LSB is sent first.

The BOP uses a return to a marking level to re-sync' to the packet stream for message acceptance & validation by BOP. The packet assembled must be of the right length and have no character errors, and commence with the FF02 pattern to pass the first test of validation. Only if a fully valid command is received will the BOP send a STATUS packet, otherwise no action is performed and the existing timeout triggered by the previous command will continue to run. The remainder of the packet must pass the CRC check, then the message field will be checked; only the keypad fixed length messages will be accepted. Finally the command field is checked; only LOGIN, NOUP and UPSEGS values are accepted.

There are timeout periods for both inverter and keypad, however the timeout period will be dependent upon the baud rate. Timeouts are set running by the transmission of a message and cleared by the receipt of a checked, valid message. They measure the time from start of message out to the return of a complete message. In normal operation the message response period should be much less than the timeout period. As the default will be 9k6 baud for LOGIN, the timeouts for the keypad and drive, respectively will be: 200 ms and 300 ms. Typical turnaround time for the inverter will be in the region of 100 ms. Each 100 ms scan will cause a transmit of a command message to BOP.

In operating the serial link protocol, once the link is established, as long as no errors occur, the sequence of events below is followed:

1. The drive issues a command packet to the BOP (this may, or may not, contain display update information). Drive time T0=current time, the drive starts its 300 ms timeout if not running;
2. After any packet has been sent to the BOP, the drive transmit line returns (or remains) in the marking state;
3. The BOP will receive a command, validate it and if OK;
4. The BOP will clear and restart its 200 ms timeout;
5. The BOP assembles and transmits a STATUS packet (or LOGIN if requested by the command);
6. In parallel with the transmission, the BOP will perform any display updating;
7. The BOP transmitter will returns to a marking state;
8. The drive will receive a fixed length packet and check the CRC, if incorrect nothing will occur, otherwise;
9. The drive will clear its timeout and log the switch settings; and,
10. At time=T0+scan time (typically 100 ms) the 'handshaking' cycle will continue at step 1.

The Login sequence comprises the following steps:

1. The drive controller powers up and initialises;
2. The BOP will power up and initialise—RS232 lines in marking state;
3. The drive will wait;
4. The BOP will set its display to '----' to indicate it is trying to connect;
5. Approximately 100 ms after power to the BOP reaches CPU operation level, the BOP will transmit a LOGIN message. The BOP will clear and restart its 200 ms timeout;
6. The BOP will wait for input;
7. The drive will receive, validate and decode the LOGIN packet and If OK;
8. The drive will transmit a command packet requesting all display segments to light and the drive will start a 300 ms timeout;
9. The BOP will receive a command, validate it and if OK continue as with step 4 of the standard sequence; and,
10. 500 ms later the command message will remove the display test feature having shown that all segments work.

If the drive does not receive a sensible, supported LOGIN packet at the start, then it does nothing and continues to wait for input. If the BOP does not receive a valid command packet, then when its timeout completes (200 ms), it retries the LOGIN packet. The BOP will continue to send LOGIN packets every timeout until a correct command packet is received. After 5 unanswered packets, the retry rate is reduced to once per second as described under "uplink failure sequence", though the display remains at '----' as communications has never been found.

In operation the BOP may reset at any time for a number of reasons, whilst the drive controller could well remain running. In such a case, the BOP would reinitialise, just as for power-up-reset when the fault is removed. If the disconnection lasts for a long period then the drive timeout will operate, the drive controller will take failsafe measures and will return to looking for incoming packets. In this case the protocol on reconnection would follow the Power on sequence.

If the interruption is short, <<100 ms, then some additional considerations can be brought into play, though the BOP will attempt to follow the power up sequence. It all depends at what point the BOP reset occurs. A reset while the serial link is idle will only result in a blink of the display although the reset may occur whilst the drive controller is transmitting a command packet. The BOP receiver could be re-enabled at any time in the serial data stream thus any errors in received characters will cause a reset of the receive framing such that the BOP will try to treat the next character as the start of a command packet.

The BOP needs to be able to detect the lack of activity on its receive line in order to force the end of a packet and reset the framing. If 1 ms has elapsed after the last character has been assembled and no start bit has been received, the line will be idle resulting in a timeout and any packet will be terminated. A reset may occur when the BOP is transmitting a packet, which will corrupt the current packet. The drive controller may thus receive unsolicited LOGIN packets which must be treated as a normal LOGIN operational sequence.

The drive controller should detect the idle period inserted and restart the search for a packet, discarding the current one. It would then catch the LOGON packet. Existing timeouts are left to rim in order to catch the fault if the BOP never recovers. The link from drive to BOP is deemed to have failed if no message has been received or it is not valid for the BOP, once the BOP timeout has occurred. A chance is given for it to recover in case of persistent noise immunity problems.

1. The BOP times out;
2. The BOP will clears and restarts its timeout;
3. The BOP will count the number of consecutive timeouts. If number reaches 5, see notes above;
4. The BOP transmits a STATUS packet with current key state. The message type field will indicate that this message was sent as the result of a timeout;
5. The drive will receive packet (downlink OK), validate and decode it;
6. The drive will clear its timeout;
7. The drive will count the number of consecutive timeout indications from the messages. If number exceeds 3 (3 failed messages=300 ms, max timeout for drive), see notes above;
8. At drive current time=T0+scan time (typically 100 ms), the drive will transmit a standard command packet, restarting its timeout; and,
9. Either (a) the BOP will receive a packet correctly, clear and restart its timeout, clear the consecutive timeout count and continue, or (b) the BOP will time out again.

If the number of BOP timeouts reaches 5, then the uplink is completely dead or the wrong protocol is being used, and the display is changed to "----" to indicate this fact. The display remains in this state until a valid command is received. Future message formats will be changed to the LOGIN packet, again, until a valid command is received.

1) The BOP times out;
2) The BOP will clear and restart its timeout;
3) The BOP will count the number of consecutive timeouts. Number reaches 5;
4) The display changes to "----";
5) The BOP will transmits a LOGIN packet. The message type field will indicate that this message was sent as the result of a timeout;
6) The drive may receive the packet; and,
7) The BOP will time out (200 ms) and will be restarted. This is repeated to give a 5 timeout delay (1 sec) before Step 1. This effectively slows the communication rate to give a LOGIN retry each second. Service will return to normal when the BOP receives a command.

If the number of drive/inverter timeouts reaches 3, then the uplink (indicated by the received timeout message type) is completely dead or the wrong protocol is being used, and the inverter should take any failsafe action required. Timeouts are not restarted and the inverter switches to slave mode waiting for a valid LOGIN packet. No transmissions will be started so the BOP must always timeout. It will then attempt the BOP Login sequence.

The link from BOP to inverter is deemed to have failed if no message has been received or it is not valid for the inverter, once the inverter timeout has occurred. A chance is given for it to recover in case of persistent noise immunity problems. In such a case:

1. The inverter will transmit a Command packet to BOP, and will restart its timeout;
2. Then the inverter timeout will take place;
3. Timeout will then be cleared;
4. The inverter will count the number of consecutive timeouts. If this exceeds 3 (3 failed messages=300 ms, max timeout for drive), see notes above;
5. At time=T0+scan time (typically 100 ms), the drive will transmit a standard command packet, restarting its timeout. The message type field will indicate that this is a result of a timeout;
6. The BOP will receive a packet (if Uplink OK), and validate it;
7. The BOP will clear and restart its timeout;
8. The BOP will count the number of consecutive timeouts as indicated by the message type field, and if it reaches 5, see notes below;
9. The BOP will then assemble and transmit a STATUS packet; and,
10. Either (a) the drive will receive a packet correctly, clear the consecutive timeout count and continue, or (b) the drive will time out again.

If the number of BOP timeouts reaches 5, then the downlink is completely dead or the wrong protocol is being used, and the display is changed to "-----" to indicate this fact. The display remains in this state until a valid command is received. Future message formats are changed to the LOGIN packet, again, until a valid command is received.

1) The BOP receives valid command.
2) The BOP will count the number of consecutive timeouts as indicated by message type number reaches 5;
3) The display will change to "LoSt";
4) The BOP will transmit a LOGIN packet. The message type field will indicate that this message was not sent as the result of a timeout on the uplink. The number of consecutive timeouts will be cleared and it will be likely that the drive will not receive the packet;
5) By this stage the drive will have returned to a slave state and will not transmit;
6) The BOP will time out (200 ms) and will be restarted, a process that will be repeated to give a 5 timeout delay (1 sec) before Step 4. This effectively slows the communication rate to give a LOGIN retry each second. Service will retry to normal when the BOP receives a command.

If the number of drive/inverter timeouts reaches 3, then the downlink will be assumed to be completely dead or the wrong protocol is being used, and the inverter should take any failsafe action required. Timeouts are not restarted and the inverter will switch to slave mode whilst waiting for a valid LOGIN packet. No transmissions will start so the BOP must always timeout. It will then attempt the BOP Login sequence.

Full link failure is a combination of both failures. As both ends will not receive messages then both BOP and drive will timeout and retry. The BOP will display "LoSt" after 5 retries, and switch from STATUS packets to LOGIN packets at a slower rate. The drive will give up resending command packets and revert to the slave mode awaiting a LOGIN packet.

The method and protocol described is applicable to MicroMaster Basic, Micro/MidiMaster Vector and Combi. The invention provides a flexible interface between a remote demountable operator panel and an associated drive controller. Input data can consist of up to 7 buttons with transparent passing of multiple simultaneous keys if required for maintenance or development work. Output data can consist of 7 segment display data for between 5 digits and up to 11 legends, or 6 digits, with optionally independent leading minus on both systems.

The basic operator panel is designed to function as known user interfaces, with the additional feature of the BOP being capable of being mounted up to 20 m from the drive. The BOP comprises a 5 digit 7-segment display and 7 buttons. Up to 11 discrete extra display elements may be used to indicate legends (amps, hertz, seconds, rpm, volts, percent etc) or leading half minus. The interface is flexible to accommodate a 6 digit display option and extra key switches options. The display may be LED or LCD.

What is claimed is:

1. A drive controller and operator panel operable to control a drive that supplies motive power to a device; wherein:

the operator panel is removable with respect to the drive controller, and includes data input means and a first data transfer port;

the drive controller is operatively connected to the drive and includes a second data transfer port which cooperates with the data transfer port of the operator panel to enable the drive controller and the operator panel to communicate control data by means of a serial protocol;

said operator panel is alternatively connectable to a plurality of drive controllers via said first data transfer port, for controlling differing types of devices; and the serial protocol includes data indicating the device type of the device transmitting the data.

2. The apparatus according to claim 1, wherein the data transfer is effected by optical means, the drive controller and the operator panel each having a cooperating optical transmitter and optical receiver.

3. The apparatus according to claim 1, wherein the data transfer is effected by wireless electrical signals, the drive controller and the operator panel each having a cooperating plug or socket.

4. The apparatus according to claim 1, wherein the data transfer is effected by wireless signals, the drive controller and the operator panel each having a cooperating wireless transceiver arrangement.

5. The apparatus according to claim 1, wherein the protocol includes a cyclic redundancy check byte.

6. The apparatus according to claim 1, wherein the protocol includes a data field which is a field or variable length.

7. An apparatus according to claim 1, wherein the display is an LCD or an LED display, which display is provided with triplex data.

8. An operator panel operable in the arrangement of claim 1.

9. A drive controller operable in the arrangement of claim 1.

10. A signaling protocol operable in data communications to and from an operator panel which is alternatively connectable to a plurality of drive controllers to control differing types of drivers for providing motive power to differing types of mechanical devices; wherein the protocol includes data indicating the type of mechanical device to which motive power is provided.

11. A protocol in accordance with claim 10, wherein the protocol includes a data field which is a field of variable length.

12. A protocol according to claim 10, wherein the protocol includes a cyclic redundancy check byte.

13. A system for controlling operation of a device, comprising:

a drive unit that supplies motive power to said device;

a drive controller operatively connected to the drive unit and having a first data transfer port; and an operator panel which is detachably connectable to said drive controller, and which includes data input means and a second data transfer port which cooperates with said first data transfer port for communication with said drive controller when said operator panel is connected thereto; wherein, said operator panel communicates control data to said drive controller, by means of a serial protocol, for controlling said drive unit;

said operator panel is alternatively connectable to a plurality of drive controllers via said first data transfer port, for controlling differing types of devices; and said serial protocol includes data indicating the type of device to which the drive controller is connected.

* * * * *